(12) United States Patent
Lin et al.

(10) Patent No.: US 6,814,882 B2
(45) Date of Patent: Nov. 9, 2004

(54) FABRIC COATING COMPOSITION WITH LATENT HEAT EFFECT AND A METHOD FOR FABRICATING THE SAME

(75) Inventors: Yen-Hsi Lin, Wen Shan Dist. (TW); Chun-Hung Lin, Taipei (TW); Lien-Hua Chiu, Taipei Hsien (TW); Shu-Lan Yao, Taipei Hsien (TW); Cheng-Chu Lin, Taoyuan Hsien (TW)

(73) Assignee: China Textile Institute, Taipei Hsien (TW)

( * ) Notice: Subject to any disclaimer, the term of this patent is extended or adjusted under 35 U.S.C. 154(b) by 0 days.

(21) Appl. No.: 10/613,038

(22) Filed: Jul. 7, 2003

(65) Prior Publication Data

US 2004/0011989 A1 Jan. 22, 2004

(30) Foreign Application Priority Data

Jul. 8, 2002 (TW) ........................................ 91115039 A

(51) Int. Cl.$^7$ ............................ C09K 3/18; C09K 5/02; D06M 15/001
(52) U.S. Cl. ................... 252/8.91; 252/8.61; 252/70; 252/73; 252/77; 252/78.1; 165/104.17; 165/104.21; 521/65; 523/223; 524/81; 524/156; 524/196; 524/198
(58) Field of Search ................... 252/8.61, 8.91, 252/70, 73, 77, 78.1; 165/104.17, 104.21; 428/402.2, 402.21, 402.24; 521/65; 523/223; 524/81, 156, 196, 198

(56) References Cited

U.S. PATENT DOCUMENTS

| | | | | |
|---|---|---|---|---|
| 4,708,812 A | | 11/1987 | Hatfield ........................ 252/70 |
| 5,366,801 A | * | 11/1994 | Bryant et al. ................ 442/131 |
| 5,435,376 A | * | 7/1995 | Hart et al. ..................... 165/10 |
| 5,456,852 A | | 10/1995 | Isiguro ......................... 252/70 |
| 6,179,879 B1 | * | 1/2001 | Robinson et al. ............. 8/94.21 |
| 6,200,681 B1 | | 3/2001 | Jahns et al. ............. 428/402.24 |
| 6,207,738 B1 | * | 3/2001 | Zuckerman et al. ........ 524/156 |
| 6,270,836 B1 | | 8/2001 | Holman ................... 427/126.3 |
| 6,503,976 B2 | * | 1/2003 | Zuckerman et al. ........ 524/501 |
| 2003/0054141 A1 | * | 3/2003 | Worley et al. .............. 428/195 |

* cited by examiner

Primary Examiner—Anthony J. Green
(74) Attorney, Agent, or Firm—Baker & Hostetler LLP

(57) ABSTRACT

A fabric coating composition with latent heat effects and a method for fabricating the same are provided. The composition at least includes 1 part of the polymer binder, the hydrophilic microcapsule aqueous solution and the thickener, wherein the hydrophilic microcapsule aqueous solution contains 1 to 40 parts of microcapsules and the weight percentage of the thickener is about between about 2% and 12% based on the weight of the microcapsules. The water percentage of the composition is about between about 30% and 70%. The method for fabricating the composition comprises mixing the polymer binder, the hydrophilic microcapsule aqueous solution and thickener together and then stirring the composition mixture until the viscosity of the composition exceeding 6000 cps. The solution is allowed to set for between about 6 minutes and 10 hours, prior to application in fabric coating.

18 Claims, No Drawings

FABRIC COATING COMPOSITION WITH LATENT HEAT EFFECT AND A METHOD FOR FABRICATING THE SAME

BACKGROUND OF THE INVENTION

1. Field of Invention

The present invention relates to a method for fabricating a fabric coating composition. More specifically, the present invention relates to a method for fabricating a fabric coating composition with phase-change material microcapsules.

2. Description of Related Art

Heat storage (release) materials, namely phase-change materials (PCMS), undergoes physical phase changes, e.g. solid phase to liquid phase or liquid phase to solid phase, in a specific temperature range. Indeed, many materials can be regarded as PCMS in a particular temperature range. For example, in the temperature range of about 0° C., water-ice can be used as PCMS.

Two factors need to be considered for choosing PCMS, including the temperature range that PCMS is applicable and the amount of latent heat absorbed or released by PCMS during the phase change. Basically, PCMS having the proper temperature range is selected based on the environmental temperature requirements. Preferably, PCMS with larger latent heat changes are used. Since larger latent heat change allows more heat being absorbed/released during the phase change, PCMS can stay in the phase-change temperature range for a longer period.

During the heating process, the temperature of PCMS keeps rising until the melting point is reached. During the phase changing process, the temperatures of PCMS and the surrounding environment stay constant until the phase changing process is completed. If PCMS is further heated, the temperature of PCMS will go up.

If PCMS is cooled down to the phase-change crystallization temperature, latent heat will be released. As PCMS changes from liquid phase to solid phase, the temperature of PCMS keeps constant until the phase changing process is completed. After that, the temperature of PCMS keeps decreasing if it is further cooled down.

In general, PCMS changes between liquid phase and solid phase in real applications. PCMS needs to be enclosed by a covering layer to prevent loss, especially PCMS in liquid phase. Therefore, a recent technology has been developed to wrap PCMS with microcapsules, in order not to lose liquid-phase PCMS.

PCMS can be applied in the field of textile. Ordinarily, PCMS is enclosed within microcapsules and then implanted into the fibers or coated onto the fabrics. In addition to the latent heat effect, the fabrics coated with PCMS microcapsules have to provide breathability, flexibility, washability and durability, and have resistance for temperature and pressure variation as well as resistance for chemicals, in the processing steps.

The prior microcapsules for enclosing PCMS have hydrophobic shells and are dispersed in the organic solution, so that the organic solution has to be removed in order to obtain microcapsule powders or the microcapsule slurry. In U.S. Pat. No. 6,207,738, titled "FABRIC COATING COMPOSITION CONTAINING ENERGY ABSORBING PHASE CHANGE MATERIAL" and published in Mar. 27, 2001, a fabric coating composition is disclosed including an aqueous solution having microcapsules made of paraffinic hydrocarbon PCMS, a polymeric binder, a surfactant, a dispersant, an antifoam agent and a thickener.

In U.S. Pat. No. 6,503,976, titled "FABRIC COATING COMPOSITION CONTAINING ENERGY ABSORBING PHASE CHANGE MATERIAL AND METHOD OF MANUFACTURING SAME" and published in Jan. 7, 2003, the manufacturing method for the above mentioned coating composition in U.S. Pat. No. 6,207,738 is disclosed. The method comprises mixing microcapsules made of paraffinic hydrocarbon PCMS, the surfactant, the dispersant and the thickener with water to form a first dispersion solution. An antifoam agent is then added. Next, the polymeric binder, the surfactant, the dispersant, the antifoam agent and the thickener are mixed with water to form a second dispersing solution. The first and second dispersing solutions are then combined to form the coating solution.

Since the coating solution for the fabrics requires excellent dispersibility of microcapsules and the prior coating solution uses microcapsules with hydrophobic shells, it is necessary to go through complicated procedures in treating the prior coating solution, so as to obtain good dispersibility of the microcapsules.

Because the microcapsules with hydrophobic shells are used in the prior coating solution, the prior polymeric binders are either hydrophobic polymeric binders, such as a polymer made from acrylic ester, styrene, isoprene, acrylonitrile, butadiene, vinyl acetate, vinyl chloride, vinyidiene chloride, ethylene, butylenes, propylene and chloroprene, or silicone, epoxy, polyurethane, fluorocarbons, chlorosulfonated polyethylene or chlorinated polyethylene. In order to make sure these hydrophobic polymeric binders being dispersed in the water phase, surfactants and dispersants turn out to be indispensable additives.

Although the water-phase dispersing solution is used, instead of using the organic phase dispersing solution, to prevent damages to microcapsules resulting from the organic solvent, adding surfactants and dispersants in bulk in the above two patents lengthens the process time for the coating solution. As disclosed in U.S. Pat. No. 6,503,976, the first dispersing solution is required to set for 1–48 hours, preferably 6–24 hours, which is very time-consuming and uneconomic. Hence, it is desirable to obtain the appropriate coating composition (solution) with simple processes, but without the addition of surfactants and dispersants.

SUMMARY OF THE INVENTION

It is appreciated that dispersibility of microcapsules in the water phase is greatly improved by using microcapsules with hydrophilic shells, instead of using prior microcapsules with hydrophobic shells.

Accordingly, the present invention provides a fabric coating solution with latent heat effects, in which microcapsules are evenly distributed without adding surfactants or dispersants.

The present invention provides a fabric coating solution with latent heat effects, which is an aqueous solution.

The present invention provides a fabric coating solution with latent heat effects, which comprises microcapsules having hydrophilic shells.

The present invention provides a method for manufacturing a fabric coating solution with latent heat effects, which produces the appropriate fabric coating solution by way of one step process. A short duration of between about 10 minutes and 6 hours is required for the fabric coating solution to set.

In the fabric coating solution of the present invention, the microcapsules for embedding PCMS have hydrophilic shells that are formed by an interfacial condensation polymerization method.

The material of the hydrophilic shell is the polymer polymerized from waterborne polyurethane in the water phase and lipophilic monomer in the organic phase. The waterborne polyurethane in the water phase is, for example, waterborne polyurethane containing 2,2-bis (hydroxymethyl) propionic or its triethylamine salt, waterborne urethane containing sulfite diethylamine salt and mixtures thereof. The lipophilic monomer in the organic phase is, for example, melamine or isocyanate salt.

The phase-change material is selected from the following group consisting of carboxylic ester, alkyl or aromatic hydrocarbons, saturated or unsaturated C6–C30 fatty acids, aliphatic alcohols, C6–C30 aliphatic amines, esters, natural or synthetic wax, halogenated hydrocarbons and mixtures thereof. Esters can be C1–C10 alkyl fatty acid esters, such as, propyl (or methyl) palmitate, methyl stearate, methyl palmitate or mixtures thereof or methyl cinnamate.

After homogenized in high speed, emulsified and heating, the PCMS enclosed microcapsules are dispersed in the water phase. Finally, a solution having 25%–55% solids is obtained. The size of the microcapsules is between about 1 micron and 10 microns. The polymeric binder and the thickener are added into the microcapsule solution and the mixture is stirred in a speed of 1000–4000 rpm until the viscosity of the solution is between about 6000 cps and 12000 cps. The microcapsule solution is kept still for 10 minutes to 6 hours and is ready to be applied for fabric coating. If large amounts of bubbles are present in the mass production, the antifoam agent can be added as an optional choice, but not a requisite condition.

Because the microcapsules have hydrophilic shells, the microcapsules are readily distributed in the water once the microcapsules are formed. The purpose of using the polymeric binder is to affix the microcapsules to the fabrics. Generally, the polymeric binder can be silicone, epoxy resin, waterborne polyurethane, fluorocarbons, chlorosulfonated polyethylene, chlorinated polyethylene, melamine or isocynate ammonium. The amount of the polymeric binder is about 1%–90% relative to the amount of microcapsules.

The purpose of using the thickener is to make the coating solution more viscous, so that the coating solution stay on the fabrics and will not permeate through the textile. Preferably, the thickener is selected from the following group consisting of poly acrylic acid, cellulose ester and its derivatives, polyethylene alcohol, other well-known thickening agents and mixtures thereof. The amount of the thickener is about 2%–12% relative to the amount of microcapsules. The antifoam agent can be fatty acid salts, sulfonates, waterborne dispersible silicon oil or waterborne dispersible silicon powder. The amount of the antifoam agent is about 0%–1% of the amount of the coating solution. The water content in the coating solution is between about about 30% and 70%.

The present invention provides a fabric coating solution with latent heat effect. Without additionally adding dispersants and surfactants into the solution, the coating solution is obtained through one single process of mixing and stirring. The coating solution of the present invention is allowed to set for between about 10 minutes and 6 hours, prior to application. Compared with the prior art coating solution, the coating solution obtained from the method of the present invention can reduce costs and greatly save time.

DESCRIPTION OF THE PREFERRED EMBODIMENTS

It is to be understood that both the foregoing general description and the following detailed description are exemplary, and are intended to provide further explanation for the fabric coating solution and the method for manufacturing the same in the present invention.

EXAMPLE 1

1 g of sodium isocynate is added as the polymeric binder into 100 g of microcapsule aqueous solution having 40% PCMS enclosed hydrophilic microcapsules. 3.5 g of polyethylene alcohol is then added into the mixture, followed by stirring at a speed of 1000 rpm until the viscosity of the solution is larger than 8000 cps. The solution is allowed to set for 20 minutes and the resulting fabric coating solution has a water-content of 57.4%.

EXAMPLE 2

36 g of waterborne polyurethane/melamine resin is added as the polymeric binder into 100 g of microcapsule aqueous solution having 40% PCMS enclosed hydrophilic microcapsules. 1.48 g of cellulose ester is then added into the mixture, followed by stirring at a speed of 300 rpm until the viscosity of the solution is larger than 6500 cps. The solution is allowed to set for 2 hours and the resulting fabric coating solution has a water-content of 43.6%.

EXAMPLE 3

44 g of waterborne polyurethane/isocyanate is added as the polymeric binder into 100 g of microcapsule aqueous solution having 50% PCMS enclosed hydrophilic microcapsules. 1.48 g of cellulose ester is then added into the mixture, followed by stirring at a speed of 2000 rpm until the viscosity of the solution is larger than 7000 cps. The solution is allowed to set for 4 hours and the resulting fabric coating solution has a water content of 34.3%.

EXAMPLE 4

1 g of isocyanate is added as the polymeric binder into 100 g of microcapsule aqueous solution having 30% PCMS enclosed hydrophilic microcapsules. 3.5 g of polyethylene alcohol is then added into the mixture, followed by stirring at a speed of 2000 rpm until the viscosity of the solution is larger than 8000 cps. The solution is allowed to set for 20 minutes and the resulting fabric coating solution has a water-content of 67%.

EXAMPLE 5

400 g of waterborne polyurethane is added as the polymeric binder into 5000 g of microcapsule aqueous solution having 40% PCMS enclosed hydrophilic microcapsules. 80 g of cellulose ester and 5.5 g of waterborne dispersible silicon powder (as the antifoam agent) are then added into the mixture, followed by stirring at a speed of 2000 rpm until the viscosity of the solution is larger than 8000 cps. The solution is allowed to set for 6 hours and the resulting fabric coating solution has a water content of 54.6%.

In general, no antifoam agent is required for small-scale production. Only in the mass production, the antifoam agent can be added as an optional choice. According to the embodiment, the amount of the antifoam agent is about 0.1% in weight.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fabric coating composition with latent heat effects, the composition comprising:

1 part of a polymer binder;

a hydrophilic microcapsule aqueous solution containing hydrophilic microcapsules with a shell made of a polymer polymerized from waterborne polyurethane and lipophilic monomer, wherein the hydrophilic microcapsule aqueous solution includes 1 to 40 parts of hydrophilic microcapsules;

a thickener, wherein a weight of the thickener is between about 2% and 12% of a weight of the hydrophilic microcapsules; and water, wherein a weight percentage of water is between about 30% and 70% of a total weight of the composition.

2. The composition of claim 1, further comprising an antifoam agent having a weight percentage of 0%–1%.

3. The composition of claim 1, wherein the waterborne polyurethane is selected from following group consisting of waterborne polyurethane containing 2,2-bis(hydroxymethyl) propionic, waterborne polyurethane containing 2,2-bis(hydroxymethyl) propionic triethylamine salt, waterborne urethane containing sulfite diethylamine salt and mixtures thereof.

4. The composition of claim 1, wherein the hydrophilic microcapsules enclose a phase-change material and the phase-change material is selected from the following group consisting of carboxylic ester, alkyl or aromatic hydrocarbons, saturated or unsaturated C6–C30 fatty acids, aliphatic alcohols, C6–C30 aliphatic amines, esters, natural or synthetic wax, halogenated hydrocarbons and mixtures thereof.

5. The composition of claim 1, wherein the thickener is selected from the following group consisting of poly acrylic acid, cellulose ester and its derivatives, polyethylene alcohol, and mixtures thereof.

6. The composition of claim 2, wherein the antifoam agent is selected from the following group consisting of fatty acid salts, sulfonates, waterborne dispersible silicon oil or waterborne dispersible silicon powder.

7. The composition of claim 1, wherein a size of the microcapsules is between about 1 micron and 10 microns.

8. The composition of claim 1, wherein the lipophilic monomer is isocyanate salt.

9. A method for manufacturing a fabric coating composition with latent heat effects, comprising the following steps:

providing a solution comprising a hydrophilic microcapsule solution containing hydrophilic microcapsules with a shell made of a polymer polymerized from waterborne polyurethane and lipophilic monomer, a polymeric binder and a thickener, wherein the hydrophilic microcapsule solution comprises a phase-change material enclosed within the microcapsules;

stirring the solution until a viscosity of the solution is larger than 6000 cps; and allowing the solution to set for a duration.

10. The method of claim 9, wherein the duration is between about 10 minutes and 6 hours.

11. The method of claim 9, further comprising adding an antifoam agent.

12. The method of claim 9, wherein a percentage of the hydrophilic microcapsules is no less than 25%.

13. The method of claim 9, wherein the waterborne polyurethane is selected from following group consisting of waterborne polyurethane containing 2,2-bis(hydroxymethyl) propionic, waterborne polyurethane containing 2,2-bis(hydroxymethyl) propionic triethylamine salt, waterborne urethane containing sulfite diethylamine salt and mixtures thereof.

14. The method of claim 9, wherein the hydrophilic microcapsules enclose a phase-change material and the phase-change material is selected from the following group consisting of carboxylic ester, alkyl or aromatic hydrocarbons, saturated or unsaturated C6–C30 fatty acids, aliphatic alcohols, C6–C30 aliphatic amines, esters, natural or synthetic wax, halogenated hydrocarbons and mixtures thereof.

15. The method of claim 9, wherein the lipophilic monomer is isocyanate salt.

16. The method of claim 9, wherein the thickener is selected from the following group consisting of polyacrylic acid, cellulose ester and its derivatives, polyethylene alcohol, and mixtures thereof.

17. The method of claim 11, wherein the antifoam agent is selected from the following group consisting of fatty acid salts, sulfonates, waterborne dispersible silicon oil or waterborne dispersible silicon powder.

18. The method of claim 9, wherein a size of the microcapsules is between about 1 micron and 10 microns.

\* \* \* \* \*